DATA PROCESSING SYSTEM

Filed Nov. 9, 1956

Inventors
MICHEL C. POYLO
ROBERT L. WHITTLE
By Percy P. Lantzy
Attorney

United States Patent Office 2,947,978
Patented Aug. 2, 1960

2,947,978

DATA PROCESSING SYSTEM

Michael C. Poylo, New York, N.Y., and Robert L. Whittle, Cedar Grove, N.J., assignors to International Telephone and Telegraph Corporation, Nutley, N.J., a corporation of Maryland Filed Nov. 9, 1956, Ser. No. 621,400

12 Claims. (Cl. 340—174)

This invention relates generally to data processing systems and in particular to devices for storage and readout of permanent and variable data which must be readily accessible for visual inspection and likewise readily accessible for use in a data processing operation such as computation.

The storage and readout of information in data processing and especially in electronic computation has for the most part become the limiting factor of a system's capability. It soon became clear as the popularity of the electronic computer increased, that the storage facilities of the various computers were inadequate. In the early versions of the electronic computers facilities there was provided for approximately twice the number of storage positions as there were positions or digits in the final multiplication answer. To overcome this limitation both mechanical and electronic storage units were developed, which could be cabled into these already existing machines. The mechanical storage units took the form of counter wheels which were usually driven from a central driving source and which each carried a set of brushes to produce a pulse in the commutator like fashion in order to translate information from a mechanical to an electrical medium. The electronic storage devices were usually bistable multivibrators serially connected to make up a limited binary counter. Both of these systems are reliable but have an inherent disadvantage in that the equipment space necessary to effect their respective operations as compared to their utility is great. The design trend moved to magnetic tapes and magnetic drums which afford a great deal of storage capacity viewed from the equipment necessary for the related utility and which on the overall are faster for write-in and readout.

Magnetic tapes serve as fine storage devices in that a power shutoff does not destroy or lose the stored data and assuming multiple lanes there can be more than 1,000 bits of information per square inch stored. The magnetic tape, however, does have limitations for an abundance of stored information, such as a complete file, in that there is an unwinding and rewinding operation necessary to extract information buried in the middle of the tape. The magnetic drum serves as an even superior storage device than the tape, for it likewise does not lose the data with a power shutdown, nor by a readout operation and there is no unwinding or rewinding necessary, since the information bits can be detected at the surface of the drum. With the advent of a new type of reading head the conventional drum can store and readout approximately fifteen hundred bits per square inch. The limitation on the drum is that of the surface of the drum, and may not be a serious limitation for ordinary handling of information in a particular problem. The limitation of the surface of the conventional drum does, however, become real, if the drum is to be used to store an abundance of information such as a permanent file and simultaneously is used as a data processing system component. The various other storage methods such as the delay lines and electrostatic devices all have serious limitations in that the information is lost with a power shutdown or a readout, hence these systems could not be used to store permanent information.

As the data processing art has moved forward it has become apparent that a storage system wherein the information can be stored and not lost by a power shutoff or a data readout, wherefrom the information can be readily extracted and wherein a complete file of information can be stored with virtually little practical limitation on storage capacity is highly desirable.

It is therefore an object of this invention to provide an improved data storage system for storing and reading out data information.

It is a further object of this invention to provide a data storage system whose capacity for storage is virtually unlimited in light of the practicalities of the information processed and whose capacity for readout is characterized by ready accessibility of the stored information.

In a preferred embodiment of our invention the abovementioned objects are rendered possible by joining together a plurality of circular magazines in each of which there is mounted for individual rotation a plurality of reels on each pair of which there is wound a film. This film is divided into two sections, one portion is photosensitive and the other portion is magnetically sensitive. The purpose of the divided film is to record on said photosensitive portion any data which is of a permanent nature and on the magnetic sensitive portion any data which is of a variable nature and which is likely to be erased and changed during a given period of time. On the photosensitive portion of the film there is also written a code for identification of the frames of film, according to a predetermined identification code system. The use of this split film permits flexibility and yet much greater capacity than storage devices heretofore considered. With the current reading and writing technique on film, as disclosed in U.S. patent application Serial No. 546,213 by P. R. Adams—M. Rogoff, it is possible to store and readout in the neighborhood of ninety thousand bits of information per square inch. While we show reels of film in the embodiment illustrated it will be clear to those skilled in the art that any information storing medium may be employed and that any suitable transducer may be utilized for writing and/or reading information into or out of said medium.

By using a plurality of reels the unwinding and rewinding time is reduced and by having the reels stored in a plurality of circular rotatable magazines forming a drum, the reels are readily accessible for scanning. The reading head for extracting the information in the preferred embodiment can be a combination photoelectric scanner arrangement and a magnetic reading, writing and erasing head.

The photoelectric scanner arrangement portion of the combination reading head can be of the type described in the article entitled "Character Recognition For Business Machines" found in the February 1956 issue of "Electronics" published by McGraw-Hill, wherein the characters can be read from the film and passed to a display device such as a television tube, and also wherein the same characters can be converted into a binary code form. Since the magnetic reading head must be capable of reading out while a film frame is standing at rest, the magnetic head can be preferably of the well-known moveable variety wherein the head has a plurality of magnetically sensitive elements which are rotated through the flux associated with the tape bit. When information is desired the abovementioned code is offered to a selection device either by manually dialing it or by an automatic entry from the data processing system. The selection device can be of the well-known Strowger switching arrangement used in standard telephone systems, and to which there is made reference in the text "Telephony" volume 1 by J. Atkinson published in 1948 by Pittman and Sons, London. The selection device, being controlled by the coded information, signals a first driving means to move the reading head to the proximity of the proper circular drum, simultaneously signals a second driving means to rotate the drum until the selected reel is under the head and after determining that the selected reel is properly located, signals a third driving means to clutch engage the reels and drive them in the proper direction for scanning. When the selected frame has arrived at the readout position the information is detected in the reading head and passed respectively to either a translation network or a switching network.

The translation network and the switching network can be a portion of the circuitry used in connection with the photoelectric scanner as described in the article in "Electronics" mentioned above. At the translation network, for instance, if visual display is the aim of the operation, the information is translated to the proper configuration to render the information in clear language on a television display. This information emanating from the reading head can alternatively be passed to a data processing system through a matrix switching network if the aim of the operation is further use of the information such as a computation. The preferred embodiment shows a single reading head although a plurality of reading heads can be used to eliminate one of the moving operations and thus speed the readout. Such a design with multiple reading means might not be in the best economic interests in that the speed of other parts of the data processing system, such as printers, might be relatively slow, and therefore to add more equipment to speed the readout would lead to an economic folly.

The above mentioned and other features and objects of this invention will become more apparent by reference to the following description taken in conjunction with the accompanying drawings.

Figures 1, 2, 3:
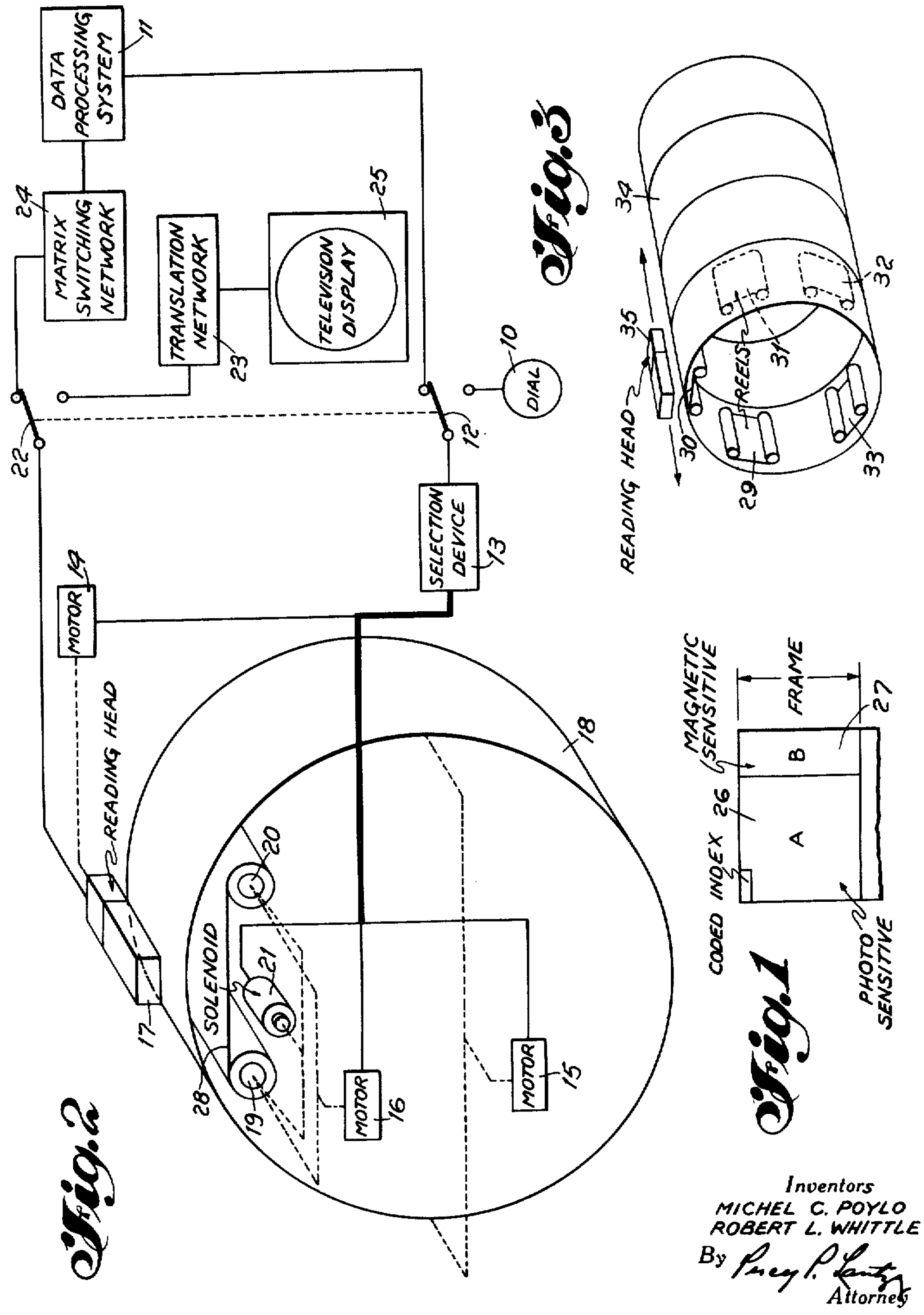
Fig. 1 is a diagram of a typical film frame.
Fig. 2 is a combination block diagram and picture presentation of the complete system.
Fig. 3 is a pictorial presentation of the drum showing the reels mounted inside.

In Fig. 2 there is a dial at 10 and data processing system at 11, each of which is connected through a switch at 12 to a selection device at 13. The selection device at 13 is electrically coupled respectively to the motors at 14, 15 and 16. Motor 14 is mechanically coupled to move the reading head 17. Motor 15 is mechanically coupled to rotate the circular magazine 18 and motor 16 is mechanically coupled to drive the clutch discs 19 and 20. Clutch discs 19 and 20 are clutched in and out by the solenoid 21, which is also electrically coupled to the selection device 13. The reading head 17 is electrically coupled to switch 22, through which the reading head is coupled either to the translation network 23 or the switching network 24. The television display 25, is electrically coupled to the translation network 23, while the data processing system 11 is coupled to the other side of the matrix switching network at 24.

In Fig. 1, data information of a permanent nature is stored on 26, while data information of a variable nature is stored on 27. Assume a reel of film at 28 in Fig. 2 to be made up of a plurality of frames as shown in Fig. 1 and further assume that this film represents the information necessary for printing up the payroll of an industrial plant on pay cheecks to be distributed. On the portion 26 we would have the permanent information such as the employee's name, badge number, social security number, the number of dependents, regular bond deductions, et al. The employee's pay rate would be either permanent or variable information but for the purposes of the hypothetical we will consider the pay rate as permanent information. On the variable portion of the frame at 27, Fig. 1, there would be stored the number of hours worked, gross pay, year to date, et al. The information for many employees will be stored on one frame, and it follows that whole departments could be stored on one reel. The drum becomes the file for this information as well as a component in the data processing apparatus, thus eliminating a great deal of duplication of filing and handling.

Assuming now that the payroll is to commence being computed and printed on the checks, the computer of the data processing system would send a coded signal to the selection device 13 through switch 12, whereby the selection device 13 would drive motor 14 to move the reading head 17, to the selected magazine 18 and would simultaneously signal drive motor 15 to rotate the drum or magazine 18 until reel 28 was under the reading head 17. After directing the selected reel 28 to where it can be scanned, the selection device 13 signals solenoid 21 to engage the clutch discs 19 and 20 and simultaneously signals drive motor 16 to rotate discs 19 and 20, whereby film 28 can be scanned. As the information is read from film 28 by reading head 17 it is converted into electrical pulses which it transmits to the matrix switching network 24, wherein the information is transposed into a coherent form and passed to the data processing system for computation, collating, printing or other operations. It is clear that at the magnetic reading head the information extracted could be erased and new information added; to wit, changing the "gross year to date" earnings, as the new week pay totals are figured and added to the old gross. Since the drum is designed to be a complete file it becomes obvious that there will be a necessity for reading an individual frame very often in a manner analogous to the operating personnel taking an individual punched card from a file or an original time card from a file. When this need arises the operator can transfer the switches 22 and 12 to insert respectively the television display 25 and the control dial 10 into the circuit. By dialing the proper code at 10 the selection device 13 controls the locating operations in the same manner as described for the automatic operation above and the frame is selected and read. The information is transmitted to the translation network 23, where it is converted for use with the television screen, so that the data to be checked can be read in clear language.

In Fig. 3 the reels at 29 through 33 are shown within the end circular magazine and the plurality of magazines are shown forming the drum 34. The read head 35 is depicted in this presentation in two sections to illustrate the photosensitive readout and the magnetic sensitive readout.

The selection device 13 is a stepping switch device of the Strowger type, actuated by a dialing system or the like, similar to that used in conventional telephone dialing systems. Each digit dialed delivers to the stepping switches a number of pulses corresponding to the number being dialed.

The number of pulses delivered to the stepping switch determines the point at which the switch stops. With four contacts on the switch, any number from 0 to 9 can be represented in a binary code, where a 1 would be represented by a contact on the switch and a 0 (zero) by an open circuit on the switch.

The first digit dialed sets up the code for a number corresponding to the number representing the section of the drum shown in Fig. 3 at which it is desired that the reading head 35 come to rest. The reading head then moves to that position of the drum corresponding to the number code. As the reading head moves, contacts on the reading head (not shown) set up a series of codes, which are then compared in the matrix switching network 24 with the code set up in the selection device 13. When these two codes match, the reading head 35 comes to rest.

The second digit dialed selects a particular reel and causes the drum to rotate until the code is set up on the drum corresponding to that previously set up on the selection device. Again the comparison is made through the matrix switching network 24, and when the two codes match the drum ceases to rotate.

The third digit or group of digits dialed selects a particular frame in the photographic reel 26. This causes the motor driving the reel to pull the film past the reading head until the reading head finds the recorded code index on the frame 26 (in the left hand corner) corresponding to the code previously set up in the selection device. The comparison is made again and the motor driving the reel stops.

The photographic reading head 17 may be a flying spot scanner consisting of a cathode ray tube mounted over the film 26 in the manner disclosed in the aforementioned P. R. Adams et al. application, Serial No. 546,213. The cathode ray beam is representative of a moving point source of light that periodically illuminates each incremental area of the photographic film.

A photocell as shown in the aforementioned P. R. Adams et al. application mounted underneath the film receives alternate impulses of light depending on whether the area being illuminated by the cathode ray tube is transparent or opaque. This produces a train of pulses at the photocell corresponding to the binary code recorded on the photographic film A (Fig. 3). That portion of the film B coated with magnetically sensitive material is scanned by a magnetic reading head rotated so as to move past the area corresponding to a single frame. Various known forms of magnetic reading heads 17 are suitable for this purpose, for example, a type known as Ampex Video Tape Recorder disclosed in the Journal of the Society of Moving Picture Engineers and Television Engineers, volume 66, Number 4, April 1957, page 178, Fig. 1. Alternatively, the reading head may be moved in a motion of translation instead of rotation, whereby the pick-up coil or the reading head is moved past the stationary magnetic recording.

While we have described the principles of our invention in connection with specific apparatus, it is to be clearly understood that this description is made only by way of example and not as a limitation to the scope of our invention as set forth in the objects thereof and in the accompanying claims.

We claim:

1. In a data processing system, a magazine containing a plurality of reels of film for storing information thereon in a plurality of frames, each frame having a separate permanent recording and an erasable recording, an information reading head, means to move said reading head into an information translation relationship with a selected one of said reels, and means to select any of said frames for reading purposes by moving the film contained on a selected reel relative to said reading head and means to rotate the magazine in accordance with a coded signal.

2. In a data processing system, a magazine containing a plurality of reels of film for storing information thereon in frames having a photographic and magnetic sensitive area adjacent to each other, an information reading head, first control means to move said reading head relative to said reels of film, and second control means to move the film contained on a selected one of said reels relative to said reading head and means to rotate the magazine in accordance with a coded signal, and a receiving means coupled to said reading head for receiving a selected frame of information.

3. In a data processing system a data storage and readout device for storing information on a film comprising a plurality of reels of film, said film being divided into a photosensitive area and a magnetic-sensitive area, a magazine wherein said films are mounted for individual movement, a movable film reading head disposed for reading said photosensitive area and said magnetic-sensitive area of said film, a selection device for selectively controlling the movement of said magazine and said reels, and first and second moving means coupled to said selection device, said first moving means for moving said magazine relative to said reading head whereby any reel mounted in said magazine can be selected for reading, said second moving means for moving said selected reel whereby any particular frame of information on said reel can be read.

4. In a data processing system, a data storage and readout device for storing information on a film comprising a plurality of reels of film, said film being divided into a photosensitive area and a magnetic sensitive area, a magazine disposed about an axis for rotational movement and wherein said reels are mounted respectively for individual movement, a movable film reading head disposed for reading and transmitting information from said photosensitive area and said magnetic sensitive area of said film, a selection device for selectively controlling the movement of said magazine and said reels of film, first and second driving means coupled to said selection device, said first driving means for peripherally moving and stopping said magazine whereby any reel held by said magazine can be selected for scanning, said second driving means for driving and stopping said selected reel whereby a particular frame of information can be read, and a receiving means coupled to said reading head for receiving and interpreting said selected frame of information.

5. A data storage and readout device as recited in claim 4, wherein said receiving means comprises a television display arrangement and a translation device to enable said interpretation to be a viewing operation of coded and non-coded frames of information in clear language.

6. A data storage and readout device as recited in claim 4, wherein said receiving station includes a switching matrix circuit whereby said frame of information is passed in a coherent form for further use to channels of said data processing system.

7. A data storage and readout device as recited in claim 4, wherein said film reading head comprises a device for reading said photosensitive area and a magnetic reading head for reading said magnetic sensitive area.

8. A data storage and readout device as recited in claim 4, wherein said selection device comprises a mechanism whose input is manual insertion of digital information and whose output is an analog translation of said information whereby said driving means are controlled to select the move and stop respectively said magazine and said reels.

9. A data storage and readout device as recited in claim 7, wherein said selection device comprises a mechanism whose input is an automatic insertion of control information from said data processing system.

10. A data storage device as recited in claim 4, wherein said second driving means includes a transmission means whereby the winding and unwinding reels of said selected film can be engaged for driving thereby.

11. A data storage and readout device as recited in claim 4, wherein said selection device includes an electrical switching means for reversing the fields of said second driving means motor whereby said reels can be driven in a forward or backward direction.

12. In a data processing system a data storage and readout device for storing information on a film comprising a plurality of reels of film, said film being divided into a photosensitive area and a magnetic sensitive area, a plurality of magazines disposed about an axis for rotational movement and wherein said plurality of said reels are mounted for individual rotation, a film reader head disposed for movement parallel to the axis of rotation of said plurality of magazines and further disposed for reading and transmitting the information from said photosensitive areas and said magnetic sensitive areas of said film, a selection device for selectively controlling the movement of said film reader head, said plurality of magazines, and said plurality of reels, a first, second and third driving means coupled to said selection device, said first driving means for moving said film reading head to a position for scanning information content of a selected magazine, said second driving means for peripherally moving and stopping said magazines whereby any reel held by said magazines can be selected for scanning, said third driving means for driving and stopping said selected reel whereby a particular frame of information can be read and a receiving means coupled to said reading head for receiving and interpreting said selected frame of information.

References Cited in the file of this patent

UNITED STATES PATENTS

| | | |
|---|---|---|
| 2,124,906 | Bryce | July 26, 1938 |
| 2,251,998 | Goodale | Aug. 12, 1941 |
| 2,485,839 | O'Dea | Oct. 25, 1949 |
| 2,620,404 | Pond | Dec. 2, 1952 |
| 2,690,913 | Rabinow | Oct. 5, 1954 |
| 2,814,030 | Miller et al. | Nov. 19, 1957 |
| 2,821,576 | Gaubert | Jan. 28, 1958 |